Figure 1:
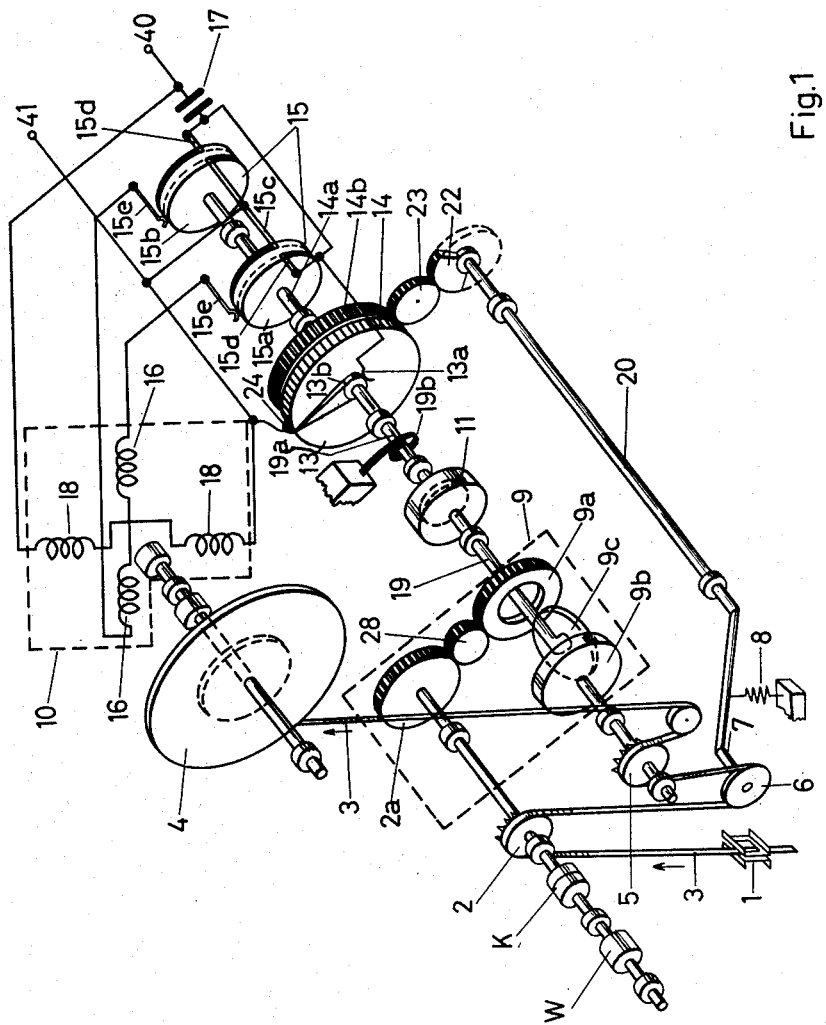

Inventors:
Herbert Bähring
Heinrich Schwerer
Karl Brammer

United States Patent Office 3,151,820
Patented Oct. 6, 1964

3,151,820
WINDING CONTROL APPARATUS
Herbert Bähring, Darmstadt, Heinrich Schwerer, Ernsthofen, Kreis Darmstadt, and Karl Brammer, Niederramstadt, near Darmstadt, Germany, assignors to Fernseh G.m.b.H., Darmstadt, Germany
Filed Feb. 27, 1961, Ser. No. 91,836
Claims priority, application Germany, Feb. 27, 1960, F 30,637
11 Claims. (Cl. 242—55.12)

The present invention relates to an apparatus for transporting an elongated flexible element, and more particularly to an apparatus for winding on a reel, or for unwinding from a reel, a flexible record carrier, such as a tape or film.

Film which passes through a film gate, or a tape passing a recording or pick-up head, is unwound from a let-off reel, and wound up on a take-up reel. As the radius of the film or tape on the reel increases or decreases, the speed of the film or tape varies accordingly so that portions of the film or tape are subjected to an uneven tension which may cause breakage.

Arrangements are known in which the tension of a film loop controls a magnetic brake which reduces the speed of the motor acting on the take-up reel. This arrangement has the disadvantage that a part of the drive force is lost. In another known arrangement, the position of a roller is controlled by the film tension, and a brake for a transporting roll for the film is operated accordingly. However, a part of the drive force for driving the transporting roller of the film is lost, and a high tension is produced in the transported film.

It is one object of the present invention to overcome the disadvantages of the prior art, and to provide an apparatus and method permitting to wind up, or to unwind a transported elongated flexible element without producing undesired high tension in the same.

Another object of the present invention is to provide an apparatus and method for accelerating a transported elongated flexible element within a very short time, for example within one-tenth of a second, to a normal operating speed.

Another object of the present invention is to provide a method and apparatus for maintaining a constant speed of an elongated flexible element while the same is wound up on a reel, or unwound from a reel.

Another object of the present invention is to provide a method and apparatus for maintaining the speed of the wound up, or unwound, portion of an elongated flexible element at a speed which is equal to the speed of another portion of the elongated flexible element which is transported by a drive roller.

Another object of the present invention is to provide a method and apparatus in which a loop in an elongated flexible element formed between a drive roll and a take-up or let-off reel, is maintained at constant length.

With these objects in view, the present invention relates to an apparatus for transporting an elongated flexible element while the same is wound up, or unwound, or both. One embodiment of the invention comprises a reel, for example a take-up reel, or a let-off reel, where the flexible element moves at a first speed, a drive roll for transporting the flexible element at a second speed, a first drive means for driving the reel, a second drive means for driving the drive roll, a control apparatus controlled by the flexible element, and regulating means for one of the drive means controlled by the control apparatus to adjust the speed of the respective drive means until the difference between the first and the second speed of the flexible element is a minimum. In accordance with the present invention, the control apparatus develops a first control effect proportional to the speed difference between the first and second speeds, and develops a second control effect proportional to the integral of the speed difference with respect to time. The control apparatus adds the two control effects to produce a combined control effect which acts on the regulating means so that the respective drive means is accordingly adjusted. In the preferred embodiment of the invention, the drive means of the reel is an electric motor whose field winding is connected to a potentiometer, which forms part of the control apparatus, and whose resistance is adjusted to depend not only on the speed difference between the speed at the reel and at the drive roll, but also on the integral of this speed difference with respect to time.

In the preferred embodiment of the present invention, a loop is formed in the flexible elongated element between the drive roll and the reel, and this loop is engaged by a roll which is displaced by the expanding or contracting loop. Since the length of the loop depends on the speed difference between the drive roll and the reel, and on the time during which such speed difference is present, the displacement of the loop-engaging roll is proportionate to the integral of the speed difference with respect to time. A control means is connected to this roll and produces a corresponding control effect, for example by moving the resistance element of a potentiometer in one direction.

The speed of the movement of the loop-engaging roll is directly proportionate to the speed difference, and another control means is actuated accordingly to produce a control effect, for example to shift a movable tap over the resistance, and in the same direction in which the resistance is moved in accordance with the first-mentioned control effect. In this manner, the two control effects are added and represented by the tapped resistance, which is connected into the field circuit of an electric motor driving the reel.

In another embodiment of the invention, a differential gearing is provided for comparing the speed of the elongated flexible element in the region of the drive roll, and in the region of the reel, and a control effect proportionate to such speed difference is again obtained.

Preferably, a device capable of transforming rotary speed into torque is used for operating the tap of the potentiometer.

The control effect which is proportionate to the speed difference becomes effective at the beginning of the control operation, while the control effect which depends on the integral of the speed difference with respect to time becomes effective at the end of the control operation, and is substantially smaller than the first-mentioned control effect. In a practical example of the apparatus of the invention, the torque produced by the first-mentioned control effect at the beginning of the control operation is 25,000 gram centimeters, while the maximum torque due to the second control effect was less than 14,000 gram centimeters.

It is preferred to adjust the control apparatus in such a manner that the speed of the take-up reel is sufficiently high to produce a desired small tension in the wound-up portion of the flexible element, and that the speed of the let-off reel is slightly retarded to produce a desired small tension in the wound-off portion of the flexible element. The additional driving torque and retarding torque, respectively are equal due to a suitable arrangement of the control apparatus.

In the preferred embodiment of the present invention, the loop-engaging roll is supported for turning movement on a spring-loaded lever whose angular speed during displacement of the roll with the expanding or contracting loop, provides the two control effects which are added to each other to produce a combined control effect according to which the drive motor of the reel is adjusted.

Figure 2:
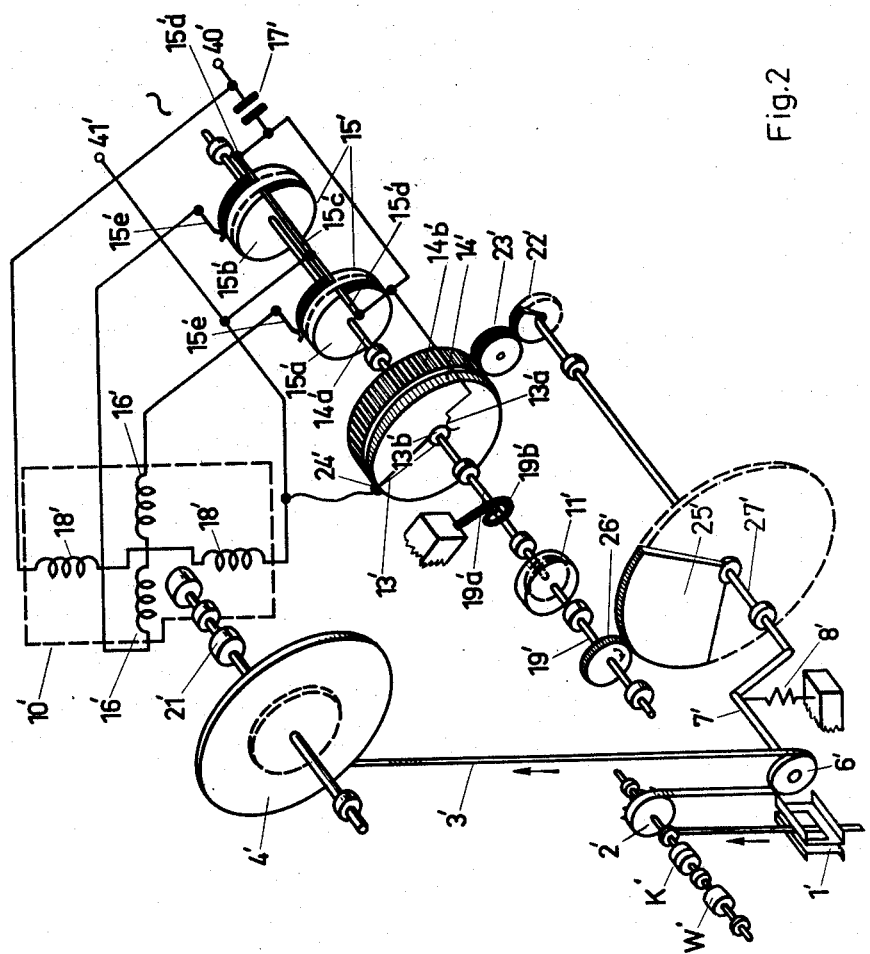
Figure 3:
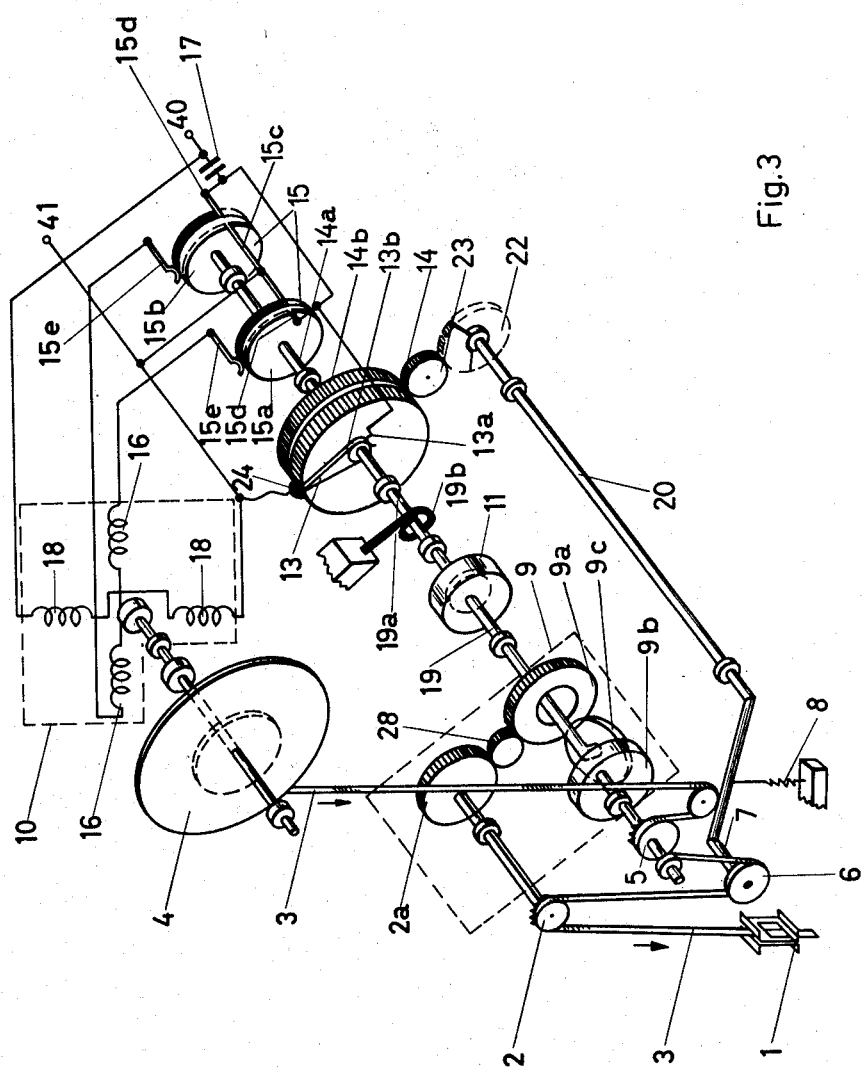
Figure 4:
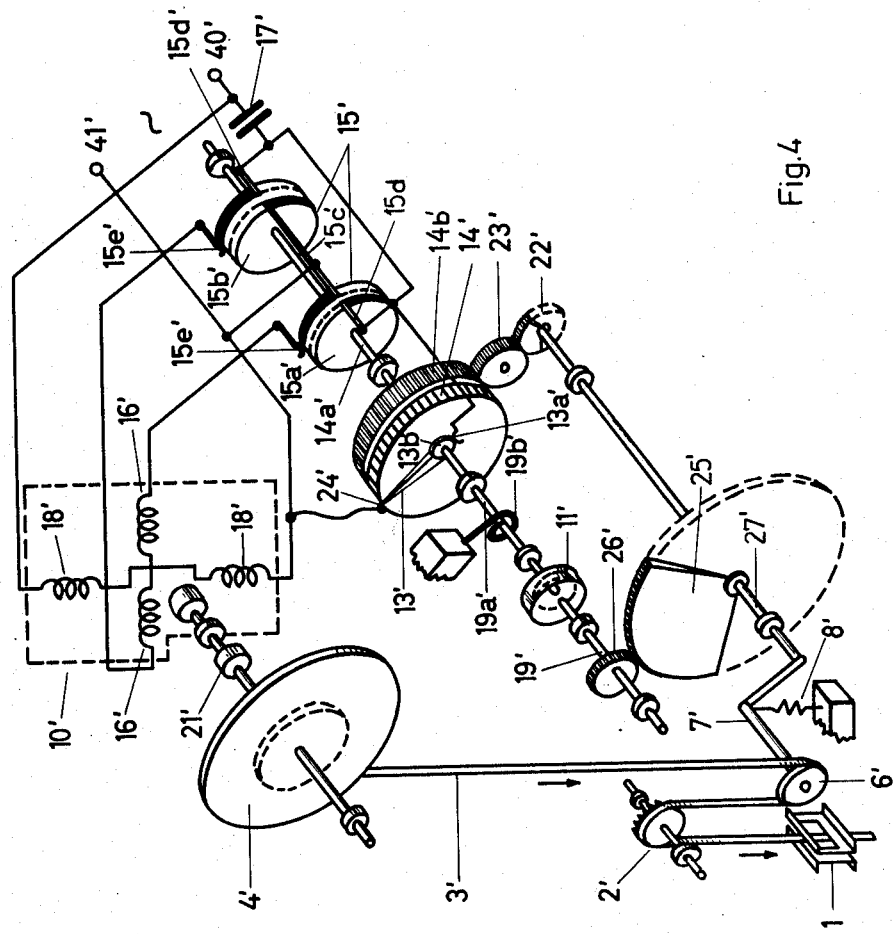
Figure 5:
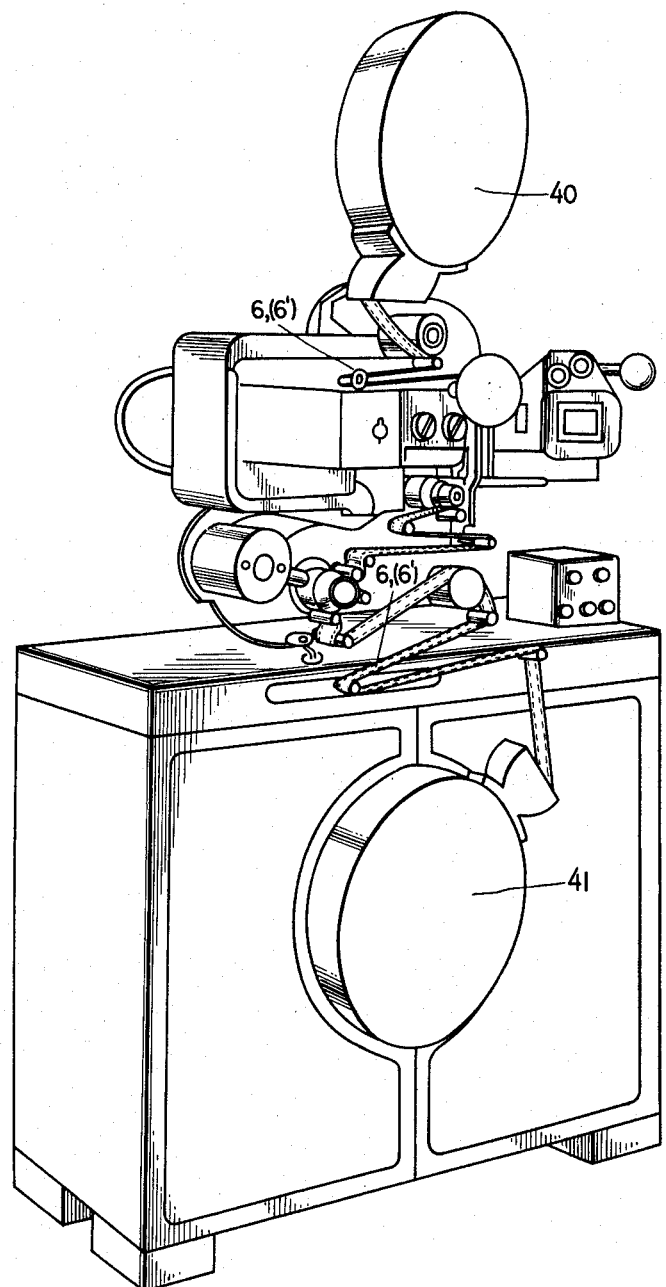

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic perspective view of one embodiment of the present invention incorporating a differential gearing for comparing the speeds of two portions of a transported film; FIG. 2 is a schematic perspective view illustrating another embodiment of the invention in which the angular displacement of a member supporting a loop-engaging roll is used to provide both control effects according to the present invention; FIG. 3 and FIG. 4 are perspective views showing feeding apparatus for the devices of FIG. 1 and FIG. 2 respectively; and FIG. 5 is a perspective view illustrating a film-transporting and scanning apparatus incorporating the present invention.

Referring now to the drawings, a film 3 passes through a film gate 1, in which it may be scanned, while being transported by a drive roll or sprocket 2 which is located directly following the film gate 1. The film is wound up on a reel 4 which is driven by the rotor 21 of an electric motor 10 having two windings 16 and 18. Corresponding apparatus according to FIG. 2 and FIG. 4 are located before the film gate 1' for feeding film 3' to the same. Elements in the embodiment of FIGS. 2 and 4 corresponding to the elements in the embodiments of FIGS. 1 and 3 are indicated by primed reference numerals.

The apparatus, however, is capable of moving the film not only in the direction of the arrows, but also in the reverse direction. Regardless of the direction of film movement, it is desired that the film is accelerated to full speed in either direction within a very short space of time, for example within one-twentieth of a second.

At the moment in which motor W is started and rotates drive roll 2, reel 4 is at a standstill. To avoid breaking of the film, a loop is formed in the film and engaged by roll 6. In the embodiment of FIG. 1, the film passes over another sprocket 5 and over a reversing roll to reel 4, whereas in the embodiment of FIG. 2, the film passes from the loop-engaging roll 6' directly to the reel 4'.

In both embodiments of the invention, roll 6 or 6' is turnably supported on a shaft portion at the end of the lever 7 or 7' which turns about the axis of a shaft 20, and 27, respectively. A spring 8 or 8' is connected to lever 7 or 7' and biases the same to turn in counterclockwise direction so that an engagement between roll 6 and the loop is assured when the length of the loop increases.

Referring now to the embodiment of FIGS. 1 and 3, a differential gearing 9 is provided to obtain a control effect proportionate to the difference between the speed of the film at the film gate 1 and at the drive roll 2, and the speed of the film at the reel 4, and at the sprocket 5. Drive roll 2 is connected to a gear 2a which drives through a gear 28 a first orbit gear 9a, while a second orbit gear 9b is driven by sprocket 5. A planetary gear 9c meshes with orbit gears 9a and 9b and transmits any planetary motion to a shaft 19. Consequently, the rotary speed of shaft 19 will be proportionate to the difference between the speed at drive roll 2 and the speed at sprocket 5 and reel 4.

Shaft 19 is connected to the impeller of a fluid coupling 11 whose other half is connected to a shaft 19a to which a torque is transmitted by the fluid coupling 11. A spring 19b is connected to the shaft 19a and counteracts the torque transmitted by coupling 11 so that the angular position of shaft 19a is proportional to the torque acting on shaft 19a, such torque being proportional to the speed of shaft 19, and consequently to the difference between the speeds at the drive roll 2 and the reel 4. A contact arm 13 which is secured to shaft 19a, will consequently be angularly displaced, and assume a final position in which the angle of displacement represents the speed difference.

Slide contact 13 moves over a circular resistor 14 fixed on a shaft 14a which carries reversing switch means 15.

The resistor part 14 is moved by means of gear 14b and gear 23 which meshes with a gear 22 on shaft 20. Consequently, displacement of lever 7 with drive roll 6 due to a change of the length of the loop of the film, will result in turning movement of gears 22, 23, and of resistor 14 relative to slider 13.

A voltage source is connected to the terminals 40 and 41. The winding 18 of the induction motor 10 of reel 4 is directly connected to the terminals 40 and 41. The winding 16 is connected to the terminals 40 and 41 through a capacitor 17, and a reversing switch means 15. The reversing switch means include two switches 15a and 15b, each of which has two contacts extending through 180°. Slide contacts 15c connect switches 15a and 15b and are connected to one terminal 41 and to the tap 24 at the center of resistor 14. Another pair of slide contacts 15d connects the reversing switches 15a and 15b to a slide contact 13a which slides on a contact ring of the movable contact arm 13. A further pair of slide contacts 15e connects the reversing switches to the end of winding 16. It is evident that turning of shaft 14a through 90° out of the illustrated position will effect reversing of winding 16, and thereby reversing of the direction of rotation of reel 4.

In the position illustrated in FIG. 1, the contact arm 13 registers with the tap 24 of resistor 14 so that the winding 16 of motor 10 is substantially shunted so that motor 10 does not produce a drive torque. Reel 4, and the film thereon, are at a standstill, and neither sprocket 5, nor the film portion thereon move. Consequently, the speed $V_1$ of the film on sprocket 5 is zero. When the apparatus is started, motor W drives drive roll 2 so that the film is drawn through the gate 1 at a selected speed $V_2$. Since the planetary motion of planetary gear 9c takes place at a rotary speed proportional to the difference between the speeds $V_2$ and $V_1$, shaft 19 rotates at a speed V which is proportionate to $(V_2-V_1)/2$, which is proportionate to $V_2/2$ at the beginning of the operation where speed $V_1$ is zero.

A torque proportional to the speed difference V is exerted on shaft 19a, and when this torque is balanced by spring 19b, the contact arm 13 is angularly displaced from tap 24 through an angle proportional to the speed difference, or to the rotary speed of output shaft 19. The portion of the resistor between tap 24 and contact 13 is now connected in parallel to winding 16, so that a proportionate part of the current flows to winding 16, energizing the motor 10 and driving reel 4. The speed of reel 4, and consequently the speed of the film passing over sprocket 5 increases, and as a consequence, the speed difference $V_2-V_1$ is reduced so that the rotary speed of shaft 19 is correspondingly reduced. In this manner, the torque transmitted by coupling 11 to shaft 19a is reduced, so that the contact arm 13 moves in opposite direction to its previous movement toward the tap 24 without reaching the same, since in an intermediate position a condition is obtained in which the speeds $V_1$ and $V_2$ are equal.

During the time period in which the speeds $V_1$ and $V_2$ are unequal, and speed $V_1$ was smaller than $V_2$, the length of the loop between drive sprocket 2 and sprocket 5 increases to a maximum. When the speeds $V_1$ and $V_2$ are regulated to be equal by displacement of contact arm 13, the film would be fed at the same speed to the loop at which it is transported away from the loop so that the loop would remain at its maximum length, which is undesirable. However the expanding loop permits a turning of lever 7 under the action of spring 8, and such turning of lever 7 is transmitted by shaft 20, and gears 22 and 23 to the resistor 14 which is turned in counterclockwise direction in the direction opposite to the angular movement of contact arm 13 obtained by shaft 19a at the start of the operation. Consequently, the part of resistor 14 between tap 24 and contact arm 13 is greater as in the event that only contact arm 13 would be operated. Since the resistance is greater, the torque exerted by motor 10 is greater, and reel 4 is rotated at a higher speed so that the film is transported over sprocket 5 at a greater speed than the speed of the film at sprocket 2, resulting in a contraction of the loop, raising of roll 6 against the action of spring 8, turning of shaft 20 in clockwise direction, and a corresponding adjustment of resistor 14 resulting in a reduction of the shunting resistance until the resistor 14 is in its initial position.

The angular displacement of lever 7 and of the resistor 14 is proportional to the length of the loop, and since the length of the loop increases in accordance with the speed difference $V_2-V_1$ and with the time during which such speed difference exists, the length of the loop is proportionate to the integral of the speed difference with respect to time, and the control effect produced by the control means 6, 7, 20, 22, 23, and 14 is also proportionate to the integral of the speed difference with respect to time.

By a suitable choice of gears 22 and 23, the speed of the turning movement of resistor 14 can be selected so that the control operation can be arranged to be aperiodic.

It is desired that the film is continuously maintained at a certain small tension, while being wound up, or unwound from a reel. To produce such small tension, an additional driving torque is produced at the take-up reel, and an additional retarding torque is produced at the let-off reel from which film is fed to the film gate, as shown in FIGS. 3 and 4. If reel 4 of FIG. 1 is used for feeding film, and reel 4 of FIG. 3 is used for winding up the film, the retarding torque is necessary at reel 4 of FIG. 1, and the additional driving torque is necessary at reel 4 of FIG. 3.

In order to obtain the additional tensioning torques on the reel, it is only necessary to displace contact arm 13 in its initial position so that it is angularly spaced from tap 24. For example, in the arrangement of FIG. 1, the contact arm is set to the right of tap 24, so that a certain shunting resistance is provided in the initial position which produces a torque on reel 4 in the wind-up direction, and this small resistance is added to the variable resistance obtained at resistor 14 by displacement of contact arm 13 under the control of shaft 19a, and by displacement of resistor 14 under control of lever 7. If retarding torque is desired, the contact arm will be set to the left of the tap 24. The angular displacements for obtaining the additional tensioning torque are varied in accordance with the radius of the coil of film on the reel in order to maintain a constant film tension, and this adjustment is automatically carried out by the turning of the resistor 14 depending on the integral of the speed difference with respect to time so that the film tension at the let-off and take-up reels is of the same magnitude, and substantially constant.

As the diameter of the coil of film wound up on reel 4 increases, the speed of the film portion driven by reel 4 will tend to increase, but by the control apparatus of the invention, the rotary speed of reel 4 is decreased accordingly so that the speed of the wound-up portion of the film is the same as the speed of the film which is transported by drive roll 2, and moreover the loop which is necessary to take up temporary speed differences, is maintained at a substantially constant length and can neither exceed a maximum, nor be contracted below a minimum length by temporary speed differences between portions of the film.

The embodiment of FIGS. 2 and 4 operates on the same principle as the embodiment of FIGS. 1 and 3. A motor 21 drives reel 4' and has two windings 16' and 18' controlled by a shunting resistor 14' whose contact arm 13' is turned in accordance with the torque produced by shaft 19'. It is necessary that shaft 19' rotates at the rotary speed which is proportional to the speed difference between the speed of the film portion in the region of reel 4' and the film portion in the region of drive roll 2'. The differential gearing 9 and the sprocket 5 of the embodiment of FIG. 1 are omitted in the embodiment of FIG. 2, and the loop of the film 3' directly connected to the reel 4'.

The loop-engaging roll 6' moves up and down as the loop contracts or expands in accordance with the speed difference, and lever 7', and shaft 26' are angularly displaced in accordance with a transverse displacement of roll 6', the angle of displacement being proportionate to the speed difference since the length of the loop increases when the speed of the film at the drive roll 2' is greater than the speed of the film portion which is wound up on reel 4'. On the other hand, if a substantial amount of film is wound up on the reel 4', the effective radius of the wound-up film is great, and the speed of movement of the wound up film may become greater than the constant speed of the film portion on the drive roll 2', in which event the loop would become smaller.

Since the angular displacement of lever 7' and shaft 27' is proportionate to the speed difference, the rotary speed of a gear sector 25' fixed on shaft 27', is also proportionate to the speed difference, and shaft 19' is driven by gear 26' meshing with gear sector 25' at a rotary speed proportionate to the speed difference. As explained above, the speed of shaft 19' produces a torque in the coupling 11' which is proportionate to such speed difference, and when the thus-produced torque is balanced by spring 12' which has a linear characteristic, contact arm 13' is angularly displaced from its initial position an angle proportional to the torque acting on shaft 19a', which is proportionate to the rotary speeds of shaft 19', gears 26', 25' and shaft 27', to the speed of displacement of roll 6', and consequently to the speed difference between the speed of the film at drive roll 2' and the speed of the film at the reel 4'.

Since the speed of movement of roll 6' is proportionate to the speed difference, lever 7' and shaft 27' will be displaced after a certain time through an angle which is proportionate to the distance through which roll 6' has moved, such distance corresponding to the length of the loop, which depends on the time during which a speed difference was effective to add film to the loop, or to take away some film from the loop. Consequently, the distance of displacement of roll 6', and thereby the turning angle of shaft 27' are proportionate to the integral of the speed difference between the speed of the film portion on drive roll 2' and the film portion on reel 4'. Since resistor 14' is turned through a proportional angle through gears 22' and 23', the total resistance between the contact arm and the tap 24' depends on both control effects, each of which adds a portion of the resistor to the shunt connected in parallel to the winding 16'.

One advantage of the embodiment of FIG. 2 over the embodiment of FIG. 1 resides in the fact that the differential gearing 9 is omitted. Another advantage is that the only connection between the control apparatus and the film transporting elements is obtained by the single shaft 27', so that the control apparatus can be arranged spaced any desired distance from the drive roll 2' and from the film gate.

Coupling 11 or 11' has been described as a fluid coupling, but any coupling by which the rotary speed of an element is transformed into a torque can be used. For example, an eddy-current coupling similar to a speedometer device, or a coupling using grease as a coupling medium can be used.

For small control ranges, or for small angular displacements of lever 7' with roll 6', the stationary friction of the contact arm 13' may be sufficient to disturb the proportionate setting of the contact arm 13' in accordance with the speed difference, so that only the turning adjustment of resistor 14' in accordance with the time integral of the speed difference would remain effective and lead to a certain hunting of the apparatus. This difficulty can be overcome by providing in addition to the fluid coupling 11', a friction coupling which is so designed that the friction torque produced thereby is equal to the friction torque produced by the contact arm 13′ and its bearings.

However, it is also possible to use in the fluid coupling a fluid having such a viscosity that adequate, and preferably aperiodic damping, is produced for the turning movement of gear 25′ and shaft 27′ whereby any hunting of the adjustment of resistor 14′ is prevented.

The slowing down of the control movement at the commencement of the adjustment of contact arm 13 by the friction of the contact arm, may be suppressed by means of an additional damping device for the control means which respond to the integral of the speed difference with respect to time, and such additional damping means is preferably provided in the form of a resiliently adjustable felt friction pad.

The invention is advantageously applied in apparatus for the recording of television signals on motion picture film, and in film scanners for obtaining television signals from motion picture film. An embodiment of an apparatus according to the present invention suitable for this purpose is illustrated in FIG. 5 which shows on top the casing 40 of the let-off reel, the loop-engaging roll 6 or 6′ from which the control of the motor driving the let-off reel is obtained, the casing 41 of the take-up reel, and the roll 6 or 6′ from which the control of the motor driving the take-up reel is obtained. The reels 4, 4′ are invisible in FIG. 5, since they are enveloped by suitable casings.

The apparatus of the present invention cannot only be used for transporting film, but can also be advantageously applied to the control of the transport of magnetic tape, or of any other elongated flexible element which is driven at one point thereof at a constant speed, while being wound on, or unwound from a reel to form a growing, or diminishing coil whose radius increases, or decreases, respectively so that the speed of the wound up, or unwound portion of the elongated flexible element would not remain constant unless the speed of the reel is automatically adjusted.

It will be understood that each of the elements described above, or two or more together, may also find a useful application in other types of transporting apparatus for an elongated flexible element differing from the types described above.

While the invention has been illustrated and described as embodied in an apparatus responsive to the speed difference between two portions of a transported flexible element, and also responsive to the integral of such speed difference with respect to time, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the range and meaning of equivalence of the following claims.

What is claimed as new and desired to be secured by Letters Patent is:

1. An apparatus for transporting an elongated flexible element, comprising, in combination, a reel adapted to have the flexible element wound thereon or unwound therefrom at a first speed; a drive roll spaced from said reel for transporting the flexible element at a second speed; first drive means for driving said reel; second drive means for driving said drive roll; a control apparatus including a means adapted to be actuated by a portion of the flexible element located between said reel and said drive roll, said control apparatus developing a first control effect proportional to the speed difference between said first and second speeds, and developing a second control effect proportional to the integral of said speed difference with respect to time, said control apparatus adding said control effects to produce a combined control effect, said control apparatus including a control device having a first movable member moving in one direction through a distance proportional to said speed difference, and a second movable member moving in the opposite direction through a distance proportional to the integral of said speed difference with respect to time so that the relative displacement of said movable members is the sum of said distances; and regulating means for said first drive means and controlled by said control apparatus in accordance with said combined control effect to adjust the speed of said first drive means to vary said first speed of the flexible element until said speed difference is a minimum.

2. An apparatus for transporting an elongated flexible element, comprising, in combination, a reel adapted to have the flexible element wound thereon or unwound therefrom; first drive means including a motor for driving said reel and having a field winding; a plurality of rolls in engagement with the flexible element and adapted to form a loop in the same; one roll of said rolls being movable transverse to the axis thereof and adapted to be displaced when the loop expands or contracts; second drive means for driving another roll of said rolls so that said other roll transports the flexible element; first control means operatively connected to at least one roll of said rolls to develop a first control effect proportional to the difference between the speed of the flexible element at said other roll and at said reel, said first control means including a rotary shaft rotating at a rotary speed proportional to said speed difference, a coupling having a first part driven by said shaft and a second part, said first and second parts being operatively connected in such a manner that the angular displacement of said second part is proportionate to said speed difference and so that said second part does not turn when said speed difference is zero; second control means operatively connected to said transversely movable roll to develop a second control effect proportional to the transverse displacement of the same and thereby to the integral of said speed difference with respect to time, said second control means including a turnable support supporting said transversely movable roll for rotation and performing an angular movement when said transversely movable roll is displaced; a control device operated by said first and second control means to add the first and second control effects and including a turnable contact arm member connected to said second part of said coupling, and a turnable resistor member connected to said turnable support for turning movement in a direction of rotation opposite to the direction of the turning movement of said turnable contact arm member so that the relative angular displacement of said turnable members represents the sum of said first and second control effects; and regulating means for said motor including circuit means for connecting said contact arm member and said resistor member parallel to said field winding so that the torque of said motor is adjusted proportionate to the relative angular displacement of said turnable members and to the effective length of said resistor whereby said first speed of the flexible element is varied until said speed difference is a minimum while said loop is maintained at a selected length.

3. An apparatus for transporting an elongated flexible element, comprising, in combination, a reel adapted to have the flexible element wound thereon, or unwound therefrom at a first speed; first drive means for driving said reel; a drive roll in engagement with a portion of the flexible element for transporting the same at a second speed; second drive means for driving said drive roll; a loop-forming roll engaging the flexible element between said drive roll and said reel for forming a loop in the flexible element, said loop-forming roll being adapted to be transversely displaced when the loop expands or contracts; a turnable support supporting said loop-forming roll for rotation and performing an angular movement when said loop-forming roll is displaced, the turning speed of said support during said angular movement being proportional to the difference between the first and second speeds, and the angle of said angular movement being proportional to said speed difference and to the time during which said speed difference prevails; a shaft operatively connected to the turnable support for turning movement so as to turn at a speed proportional to the difference between said first and second speeds; a coupling having a first part driven by said shaft and a second part, said first and second parts being operatively connected in such a manner that the angular displacement of said second part is proportionate to said speed difference so that said second part does not turn when said speed difference is zero; a control device including a first turnable member connected to said second part of said coupling, and a second turnable member connected to said turnable support for turning movement in a direction of rotation opposite to the direction of said turning movement of said first turnable member so that the relative angular displacement of said turnable members represents said speed difference and also the integral of said speed difference with respect to time; and regulating means for one of said drive means and controlled by said control device to adjust the speed of said one drive means in accordance with said relative angular displacement until said speed difference is a minimum while said loop is maintained at a selected length.

4. An apparatus for transporting a film, comprising, in combination, a reel adapted to have the film wound thereon, or unwound therefrom at a first speed; first drive means including an electric motor for driving said reel; a film gate adapted to be passed by the film; a drive roll in engagement with a portion of the film for transporting the same at a second speed through said film gate, said drive roll and said reel being located on the same side of said film gate; second drive means for driving said drive roll; a loop-forming roll engaging the film between said drive roll and said reel for forming a loop in the film, said loop-forming roll being adapted to be transversely displaced when the loop expands or contracts; a turnable support supporting said loop-forming roll for rotation and performing an angular movement when said loop-forming roll is displaced, the turning speed of said support during said angular movement being proportional to the difference between the first and second speeds, and the angle of said angular movement being proportional to said speed difference and to the time during which said speed difference prevails; a shaft operatively connected to the turnable support for turning movement so as to turn at a speed proportional to the difference between said first and second speeds; a coupling having a first part driven by said shaft and a second part, said first and second parts being operatively connected in such a manner that the angular displacement of said second part is proportionate to said speed difference so that said second part does not turn when said speed difference is zero; a control device including a turnable contact arm member connected to said second part of said coupling, and a turnable resistor member connected to said turnable support for turning movement in a direction of rotation opposite to the direction of said turning movement of said turnable contact arm member so that the relative angular displacement of said turnable members and the effective length of said resistor represent said speed difference and also the integral of said speed difference with respect to time; and regulating means for said motor controlled by said control device to adjust the speed of said motor in accordance with the effective length of said resistor until said speed difference is a minimum while said loop is maintained at a selected length.

5. An apparatus for transporting an elongated flexible element comprising, in combination, a work unit where a constant speed of the flexible element is to be maintained, a driven first rotary member for engaging the flexible element so that the same moves at a first speed in the region of said first rotary member; a second driven rotary member including a reel for engaging the flexible element and being spaced from said first rotary member so that said flexible element moves at a second speed in the region of said second rotary member, said first and second rotary driven members being located on the same side of said work unit; a loop-forming means engaging a portion of the flexible element between said first and second rotary members for forming a loop in the flexible element, said loop-forming means being adapted to be displaced when the loop expands or contracts; a turnable support supporting said loop-forming means and being turnable about an axis spaced from said loop-forming means so as to perform an angular movement when said loop-forming means is displaced, the turning speed of said support during said angular movement being proportional to the difference between said first and second speeds, and the angle of said angular movement being proportional to the integral of said speed difference over the time during which said speed difference prevails; a control apparatus operable by said support and developing depending on the angular movement of said support a first control effect proportional to said speed difference, and a second control effect proportional to said integral of said speed difference, said control apparatus adding said control effects to produce a combined control effect; and regulating means for regulating the rotary speed of one of said rotary members and controlled by said control apparatus in accordance with said combined control effect to adjust the speed of said one rotary member so as to vary one of said speeds of said flexible element until said speed difference is a minimum.

6. An apparatus for transporting an elongated flexible element comprising, in combination, a driven first rotary member for engaging the flexible element so that the same moves at a first speed in the region of said first rotary member; a second driven rotary member for engaging the flexible element and being spaced from said first rotary member so that said flexible element moves at a second speed in the region of said second rotary member; a loop-forming means engaging a portion of the flexible element between said first and second rotary members for forming a loop in the flexible element, said loop-forming means being adapted to be displaced when the loop expands or contracts; a turnable support supporting said loop-forming means and being turnable about an axis spaced from said loop-forming means so as to perform an angular movement when said loop-forming means is displaced, the turning speed of said support during said angular movement being proportional to the difference between said first and second speeds, and the angle of said angular movement being proportional to the integral of said speed difference over the time during which said speed difference prevails; a control apparatus operable by said support and developing a first control effect proportional to said speed difference, and a second control effect proportional to said integral of said speed difference, said control apparatus including a control device having a first turnable member turned by said support in one direction through a distance proportional to said speed difference when said support performs said angular movement, and a second turnable member turned by said support in the opposite direction through a distance proportional to said integral of said speed difference so that the relative angular displacement of said first and second turnable members is the total of said distances; and regulating means for regulating the rotary speed of one of said rotary members and controlled by said control apparatus in accordance with said relative displacement of said first and second turnable members to adjust the speed of said one rotary member so as to vary one of said speeds of said flexible element until said speed difference is a minimum.

7. An apparatus for transporting an elongated flexible element comprising, in combination, a driven first rotary member for engaging the flexible element so that the same moves at a first speed in the region of said first rotary member; a second driven rotary member for engaging the flexible element and being spaced from said first rotary member so that said flexible element moves at a second speed in the region of said second rotary member; a loop-forming means engaging a portion of the flexible element between said first and second rotary members for forming a loop in the flexible element, said loop-forming means being adapted to be displaced when the loop expands or contracts; a turnable support supporting said loop-forming means and being turnable about an axis spaced from said loop-forming means so as to perform an angular movement when said loop-forming means is displaced, the turning speed of said support during said angular movement being proportional to the difference between said first and second speeds, and the angle of said angular movement being proportional to the integral of said speed difference over the time during which said speed difference prevails; a control apparatus operable by said support and developing a first control effect proportional to said speed difference, and a second control effect proportional to said integral of said speed difference, said control apparatus including a coupling having a first part connected to said support for turning movement and a second part, said first and second parts being operatively connected so that the angular displacement of said second part is proportionate to said speed difference, and a control device having a first turnable member connected to said second part of said coupling and a second turnable member connected to said support for turning movement in a direction of rotation opposite to the direction of said turning movement of said first turnable member so that relative angular displacement of said turnable members represents said speed difference and also said integral of said speed difference, one of said turnable members being a contact arm, and the other turnable member being a resistor member slidably engaged by said contact arm; and regulating means including a motor for driving one of said rotary members, and circuit means connected to said motor and to said resistor member for regulating the rotary speed of one of said rotary members and being controlled by said control device in accordance with said relative angular displacement of said turnable members and with the effective length of said resistor member to adjust the speed of said one rotary member so as to vary one of said speeds of said flexible element until said speed difference is a minimum.

8. An apparatus as set forth in claim 7 wherein said first turnable member is said turnable contact arm member and said second turnable member is said resistor member slidably engaged by said contact arm member.

9. An apparatus for transporting an elongated flexible element comprising, in combination, a gate; a reel adapted to have the flexible element wound thereon, or unwound therefrom at a first speed; first drive means for driving said reel; a rotary driven member spaced from said reel and engaging the flexible element for transporting the same at a second speed in the region of said rotary driven member through said gate, said driven member and said reel being located on the same side of said gate so that the part of said flexible member transported by said driven member is wound, or unwound on said reel on the same side of side gate; a loop-forming roll engaging a portion of the flexible element between said reel and said driven member for forming a loop in the flexible element, said loop-forming roll being adapted to be displaced when the loop expands or contracts; a turnable support rotatably supporting said loop-forming roll spaced from said driven member and from said reel and being turnable about an axis spaced from said loop-forming roll so as to perform an angular movement when said loop-forming roll is displaced, the turning speed of said support during said angular movement being proportional to the difference between said first and second speeds, and the angle of said angular movement being proportional to the integral of said speed difference over the time during which said speed difference prevails; spring means biasing said support to turn with said loop-forming roll to a position in which said loop in the flexible element is taut; a control apparatus operable by said support and developing a first control effect proportional to said speed difference, and a second control effect proportional to said integral of said speed difference, said control apparatus adding said control effects to produce a combined control effect; and regulating means for regulating the rotary speed of said reel and controlled by said control apparatus in accordance with said combined control effect to adjust the speed of said reel so as to vary one of said speeds of said flexible element until said speed difference is a minimum.

10. An apparatus for transporting an elongated flexible element comprising, in combination, a gate; a reel adapted to have the flexible element wound thereon, or unwound therefrom at a first speed; first drive means for driving said reel, a rotary driven member spaced from said reel and engaging the flexible element for transporting the same at a second speed in the region of said rotary driven member through said gate, said driven member and said reel being located on the same side of said gate so that the part of said flexible member transported by said driven member is wound, or unwound on said reel on the same side of said gate; a loop-forming roll engaging a portion of the flexible element between said reel and said driven member for forming a loop in the flexbile element, said loop-forming roll being adapted to be displaced when the loop expands or contracts; a turnable support rotatably supporting said loop-forming roll spaced from said driven member and from said reel and being turnable about an axis spaced from said loop-forming roll so as to perform an angular movement when said loop-forming roll is displaced, the turning speed of said support during said angular movement being proportional to the difference between said first and second speeds, and the angle of said angular movement being proportional to the integral of said speed difference over the time during which said speed difference prevails; spring means biasing said support to turn with said loop-forming roll to a position in which said loop in the flexible element is taut; a control apparatus operable by said support and developing a first control effect proportional to said speed difference, and a second control effect proportional to said integral of said speed difference, said control apparatus including a control device having a first turnable member turned by said support in one direction through a distance proportional to said speed difference when said support performs said angular movement, and a second turnable member turned by said support in the opposite direction through a distance proportional to said integral of said speed difference so that the relative angular displacement of said first and second turnable members is the total of said distances; and regulating means for regulating the rotary speed of said reel and controlled by said control apparatus in accordance with said relative displacement of said first and second turnable members to adjust the speed of said reel so as to vary one of said speeds of said flexible element until said speed difference is a minimum.

11. An apparatus as set forth in claim 10 and wherein said elongated flexible member is a film having a portion located in said film gate and transported through said gate at said second speed by said rotary driven member.

References Cited in the file of this patent
UNITED STATES PATENTS

| | | |
|---|---|---|
| 2,656,129 | De Turk et al. | Oct. 20, 1953 |
| 2,670,906 | Daniels et al. | Mar. 2, 1954 |
| 2,854,197 | MacNeill | Sept. 30, 1958 |
| 2,990,484 | Jones | June 27, 1961 |